US009218504B2

(12) United States Patent
Rosenquist

(10) Patent No.: US 9,218,504 B2
(45) Date of Patent: Dec. 22, 2015

(54) METHOD AND APPARATUS FOR SECURE MODE INDICATION

(75) Inventor: Russell Melvin Rosenquist, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 1275 days.

(21) Appl. No.: 12/332,886

(22) Filed: Dec. 11, 2008

(65) Prior Publication Data

US 2009/0144838 A1 Jun. 4, 2009

Related U.S. Application Data

(63) Continuation of application No. 12/201,852, filed on Aug. 29, 2008, now abandoned.

(60) Provisional application No. 60/969,599, filed on Aug. 31, 2007.

(51) Int. Cl.
| G06F 12/00 | (2006.01) |
| G06F 12/14 | (2006.01) |
| G06F 17/30 | (2006.01) |
| G11C 7/00 | (2006.01) |
| G06F 21/71 | (2013.01) |
| G06F 21/57 | (2013.01) |
| G06F 21/74 | (2013.01) |
| H04N 7/167 | (2011.01) |

(52) U.S. Cl.
CPC .............. *G06F 21/71* (2013.01); *G06F 21/575* (2013.01); *G06F 21/74* (2013.01); *G06F 2221/2101* (2013.01); *G06F 2221/2105* (2013.01); *G06F 2221/2143* (2013.01)

(58) Field of Classification Search
CPC ................ G06F 21/31; G06F 21/6218; G06F 2221/2141
USPC .......... 713/168–174, 182–186, 202; 709/225, 709/229; 726/2–8
See application file for complete search history.

(56) References Cited

U.S. PATENT DOCUMENTS

| 2006/0277233 A1* | 12/2006 | Miller et al. ................... 708/160 |
| 2007/0050432 A1* | 3/2007 | Yoshizawa .............. G06F 15/16 708/130 |
| 2007/0226778 A1* | 9/2007 | Pietruszka ............ H04L 63/104 726/2 |

* cited by examiner

Primary Examiner — Evans Desrosiers
(74) Attorney, Agent, or Firm — Rose Alyssa Keagy; Frank D. Cimino

(57) ABSTRACT

A method and apparatus for a hand-held device for ensuring a secured mode transition. The method includes receiving a request to transition to a mode, determining the mode of the hand-held device, transitioning to a transition mode relevant to the received request, wherein the relevant transition mode ensures that the transition is securely executed, setting the device in accordance with the received request, and transitioning to the mode requested.

16 Claims, 4 Drawing Sheets

METHOD AND APPARATUS FOR SECURE MODE INDICATION

CROSS-REFERENCE TO RELATED APPLICATIONS

This application claims benefit of U.S. patent application Ser. No. 12/201,852 filed on Aug. 29, 2008, which claims priority from U.S. provisional patent application Ser. No. 60/969,599, filed Aug. 31, 2007, which is herein incorporated by reference.

BACKGROUND

1. Field of the Invention

Embodiments of the present invention generally relate to a method and apparatus relating to ensuring an authenticated device is tamper proof.

2. Description of the Related Art

Hand-held devices, such as, calculators, are often used in the educational environment. As a result, these devices are typically used in a classroom environment or even a testing environment to take some of the standardized state-level tests.

Students may use functionalities offered by such hand-held devices during exam in a way that jeopardizes the exam outcome. For example, students may utilize stored equations or communicate with other calculators in their network to retrieve restricted information. Hence, such functionalities may provide a tool for a student to cheat during an exam.

As a result, hand-held devices may be set to press-to-test (PTT) mode. The press-to-test mode allows a teacher to restrict the functionalities are should not be used on an exam. Hence, the teacher is able to utilize such hand-held device without being concerned that the students are cheating by utilizing unauthorized functions of the device. However, the current devices do not provide a tool that would ensure that the students would not be able to reset or change the mode of the hand-held device in a way that would make the restricted functionalities available.

Therefore, there is a need for a tamper-proof hand-held device that offers a restrictive mode and that ensures that only an authorized person is capable of activating the restrictive functionality or resetting the hand-held device.

SUMMARY

Embodiments disclosed herein generally relate to a method and apparatus for a hand-held device for ensuring a secured mode transition. The method includes receiving a request to transition to a mode, determining the mode of the hand-held device, transitioning to a transition mode relevant to the received request, wherein the relevant transition mode ensures that the transition is securely executed, setting the device in accordance with the received request, and transitioning to the mode requested.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
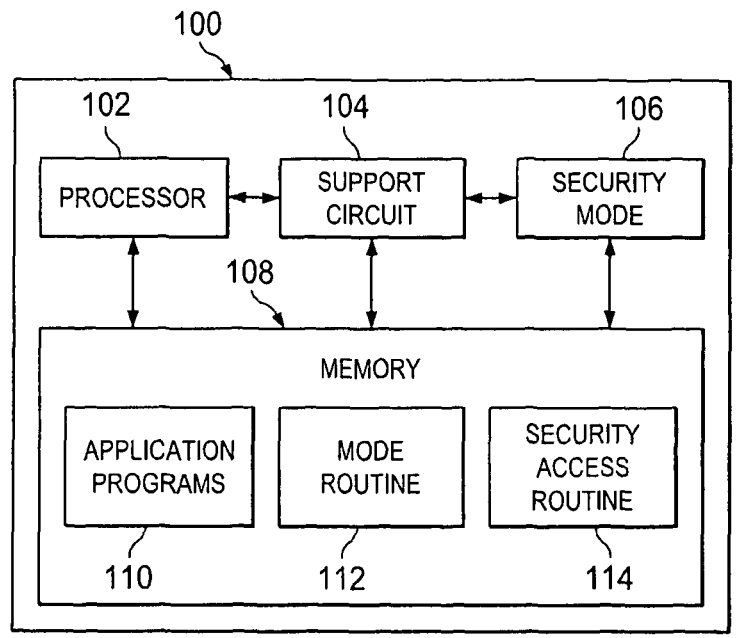
FIG. 1 is an embodiment of a block diagram of a hand-held apparatus.

FIG. 1 depicts an embodiment of a block diagram of a hand-held apparatus 100, such as, a calculator. The apparatus 100 includes a processor 102, support circuits 104, security module 106 and memory 108.

The processor 102 may be any processor capable of executing computer instructions, such as, instructions stored in the memory 108. The processor 102 may be specific to a hand-held device, calculator or the like, and may be capable of performing algebraic calculation, geometry functions and the like. The processor 102 may include normal and security peripherals that monitor and ensure that the apparatus 100 is tamper-proof, which may be monitored by the security module 106. The support circuits 104 are circuits that may include, but are not limited to, power supplies, clock circuits, cache memory and the like. The support circuits 104 assist in executing functions relating to the hand-held apparatus 100. Herein, a computer readable medium is any medium in which computer data or instruction can be stored and/or accessed.

The apparatus 100 is capable of being in various modes. One of the modes is a mode that is protected by a security module 106. The security module 106 ensures that a user is capable of changing the mode of the apparatus, for example, by checking a password, a user login, preferences, settings, or the like. For example, if the apparatus 100 is a calculator, a teacher may set the calculator to restrictive mode. A restrictive mode is a mode that restricts certain functionalities. If a student attempts to alter the mode of the calculator, the security module 106 would restrict the student from changing the calculator mode. However, the security module 106 would allow a teacher to alter the calculator's mode to a non-restrictive mode. Herein, a restrictive mode is referred to a press-to-test (PTT) mode, whereas a non-restrictive mode is referred to as a normal mode. The modes that facilitate the transition from and/or to normal and press-to-test modes are transition modes.

The security module 106 is a module that restricts the user from accessing the memory and altering data, such as, user information, forcing calculator mode, resetting the calculator, etc. As a result, a teacher may set the calculator to a restrictive mode for an exam. Due to the security module 106, the teacher would be confident that a student would not be able to utilize the functionalities that the teacher restricted by resetting the calculator, changing user preferences/settings, etc.

The memory 108 may comprise random access memory, read only memory, removable disk memory, flash memory, and various combinations of these types of memory. The memory 108 may be referred to as main memory, cache memory, buffer memory and the like. The memory 108 may store an operating system (OS), database software, various forms of application software, such as, application programs 110, mode routine 112, and security access routine 114, and the like.

The mode routine 112 allows the user to set the apparatus 100 to normal or press-to-test mode. An embodiment of the method performed by the mode routine is described in FIG. 2. The security access routine 114 is a routine that includes information utilized for allowing or denying access to mode changing. For example, the security access routine 114 may include information relating to users' preferences, settings, administrator information, teacher data, student data, etc. Therefore, the security access routine 114 may include data that is utilized by the mode routine 112 and/or the security module 106.

Figure 2:
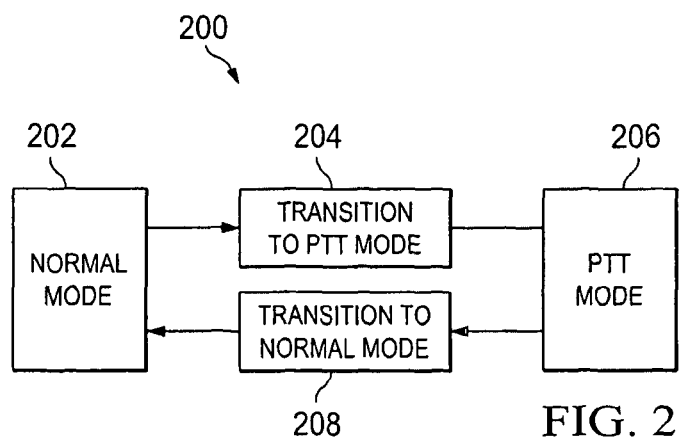
FIG. 2 is an embodiment of a flow diagram depicting mode transition method for a hand-held apparatus.

FIG. 2 is an embodiment of a flow diagram depicting mode transition method 200 for the apparatus 100. The mode transition method 200 depicts the utilization of the security feature when transitioning from one mode to another. For example, mode flow diagram 200 includes a normal mode 202, transition to press-to-test (PTT) mode 204, press-to-test mode 206, and transition to normal mode 208. When first powered the hand-held device may default to a setup screen or to the normal mode 200. However, in one embodiment, the hand-held device will default to the mode that it was in when it was shut down.

The normal mode 200 is the mode in which a user is able to access most or all of the functionalities of an apparatus, such as, a calculator. For example, in normal mode 202, a student is not restricted from using calculator functionalities. Hence, a student would be able to store equations, retrieve equations, communicate with other users on a network, etc. In the normal mode 202, a user may initiate a request to transition to press-to-test mode 206. In one embodiment, when the devise is in normal mode 202, a student would not able to alter his or her own setting to function as a teacher, administrator, allow himself or herself to reset the calculator and the like.

In press-to-test mode 206, a user is restricted from accessing certain areas of memory or certain calculator functionalities. For example, in press-to-test mode 206 a student may be restricted from using calculator functionalities, such as, storing equations, retrieving equations, communicating with other users utilizing calculators on a calculator network, etc.

In one embodiment, such restrictions may be broadcasted to a plurality of calculators or may be performed on each calculator separately. In another embodiment, a calculator may change mode only if the change mode instruction is received from a specific user or calculator. For example, a calculator may be setup to allow only a teacher to alter the mode, specify the type of functionality available when in press-to-test mode 206, setup users, etc. While in press-to-test mode 206, the hand-held device is tamper-proof. For example, the student is restricted from changing his or her setting to act as an administrator, a teacher, allow himself or herself to reset the calculator and the like. Moreover, the student is restricted from changing modes, resetting the calculator, changing functionality settings, etc.

Therefore, when in press-to-test mode 206, the calculator functionality is limited based on specified press-to-test mode 206 and/or functionality. The calculator is tamper-proof secured by utilizing security module 106 and/or security access routine 114 (both described in FIG. 1). Thus, a teacher would be confident that a calculator remains in press-to-test mode 206, for example, during an exam, and that a student is unable to alter the functionalities that she designated for the press-to-test mode 206.

When a hand-held device, such as a calculator, receives a request to transitioning from the normal mode 202 to the press-to-test mode 206, the calculator then transitions to the transition to press-to-test mode 204. In the transition to press-to-test mode 204, the calculator may enter the tamper-proof verification and may indicate that press-to-test mode 206 has been properly and securely initiated. In the transition to press-to-test mode 206, the mode transition method 200 may utilize the security module 106 and/or security access routine 114 (both described in FIG. 1). The mode transition method 200 ensures that the device or user requesting the change is authorized to perform such a request. If the person is not authorized, the request is denied or ignored. If the person is authorized, the mode transition method 200 restricts the device from performing certain functionalities. For example, the mode transition method 200 may restrict the device from archiving equations or may disable network communication, etc.

When the hand-held device, such as a calculator, receives a request to transition from the press-to-test mode 202 to the normal mode 206, the calculator then transitions to the transition to normal mode 208. In the transition to normal mode 208, the calculator performs tamper-proof verification and indication that normal mode 202 has been properly and securely initiated. The mode transition method 200 ensures that the device or user requesting the change is authorized to perform such a request. If the person is not authorized, the request is denied or ignored. If the person is authorized, the mode transition method 200 allows the device to return to its normal mode 202, wherein all the functionalities are available to the user.

Figure 3:
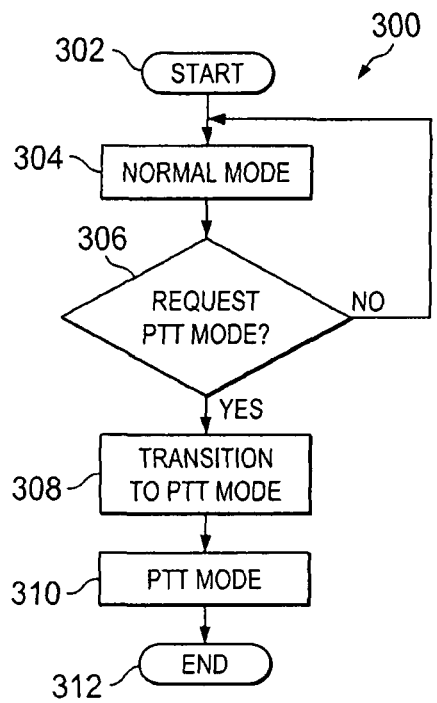
FIG. 3 is an embodiment of a flow diagram depicting normal mode to press-to-test mode method for a hand-held apparatus.

FIG. 3 is an embodiment of a flow diagram depicting normal mode to press-to-test mode method 300 for a hand-held apparatus. The method 300 starts at step 302 and proceeds to step 304. At step 304, the hand-held device is in normal mode. At step 306, the method 300 determines if a request to change to press-to-test mode is received. If there is a request, the method 300 proceeds to step 308. Otherwise, the method 300 returns to step 304. At step 310, the hand-held device is set to transition to press-to-test mode, which may include resetting the device, clearing memory, determining if the request is from an authorized user or device, and the like. At step 310, the device is set to press-to-test mode. The method 300 ends at step 312.

Figure 4:
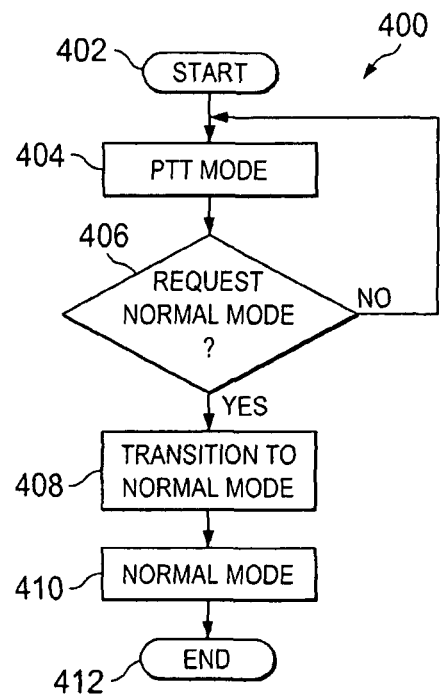
FIG. 4 is an embodiment of a flow diagram depicting press-to-test mode to normal mode method for a hand-held apparatus.

FIG. 4 is an embodiment of a flow diagram depicting press-to-test mode to normal mode method 400 for a hand-held apparatus. The method 400 starts at step 402 and proceeds to step 404. At step 404, the hand-held device is in press-to-test mode. At step 406, the method 400 determines if a request to change to normal mode is received. If there is a request, the method 400 proceeds to step 408. Otherwise, the method 400 returns to step 404. At step 410, the hand-held device is set to transition to normal mode, which may include resetting the device, clearing memory, determining if the request is from an authorized user or device, and the like. At step 410, the device is set to normal mode. The method 400 ends at step 412.

Figure 5:
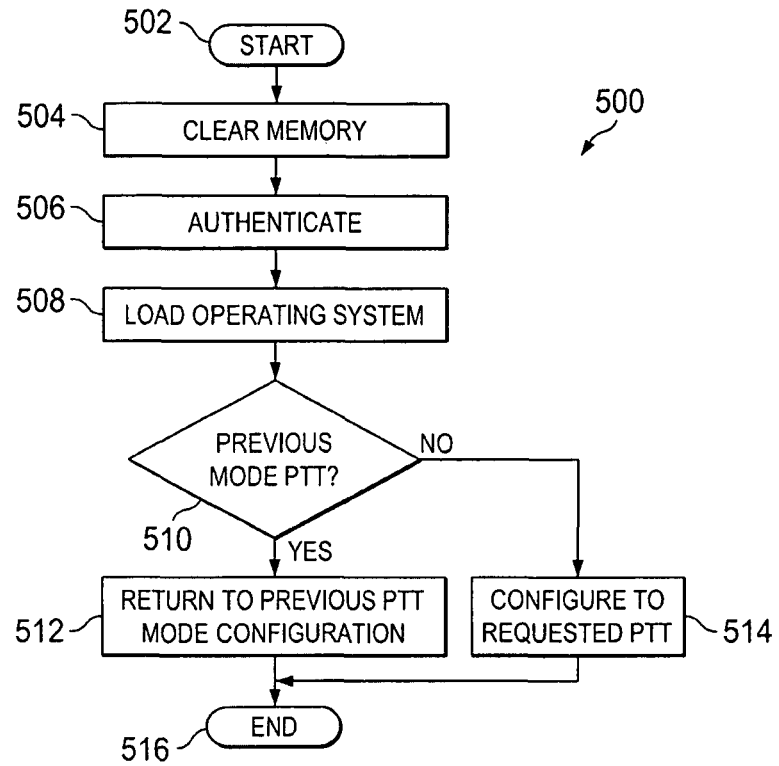
FIG. 5 is an embodiment of a flow diagram depicting transition to press-to-test mode method for a hand-held apparatus.

FIG. 5 is an embodiment of a flow diagram depicting transition to press-to-test mode method 500 for a hand-held apparatus. The method 500 starts at step 502 and proceeds to step 504. At step 504, the method 500 clears the memory, for example, to remove any memory available to rogue applications, hack software, and the like. At step 506, the method 500 authenticates the system, for example, by authenticating the hand-held device, applications, users, request and the like. At step 508, the operating system (OS) is loaded into memory. At step 510, the method 500 determines if the previous mode is a press-to-test (PTT) mode. If the previous mode is not press-to-test mode, the method proceeds to step 512, where the press-to-test mode configuration is set to the previous press-to-test configuration mode. Otherwise, the method 500 proceeds from step 510 to step 514. In step 514, the method 500 configures the press-to-test mode in accordance with the received request. From steps 512 and 514, the method 500 ends at step 516.

Figure 6:
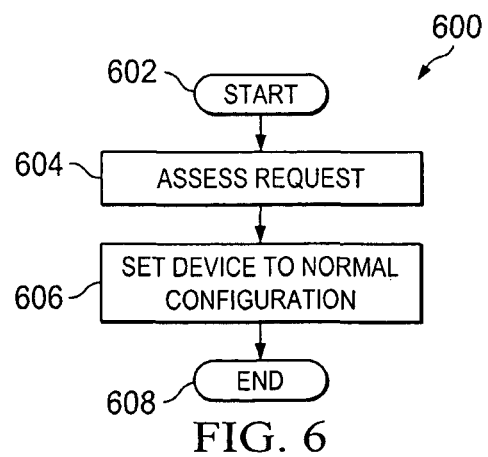
FIG. 6 is an embodiment of a flow diagram depicting transition to normal mode method for a hand-held apparatus.

FIG. 6 is an embodiment of a flow diagram depicting transition to normal mode method 600 for a hand-held apparatus. The method 600 starts at step 602 and proceeds to step 604. At step 604, the method 600 accesses the request, for example, determining authorization, requesting user or device, if the request is valid, and the like. If the assessment returns a negative outcome, the method 600 may ignore the request. At step 606, the method 600 sets the device to normal configuration. The method 600 ends at step 608.

Figure 7:
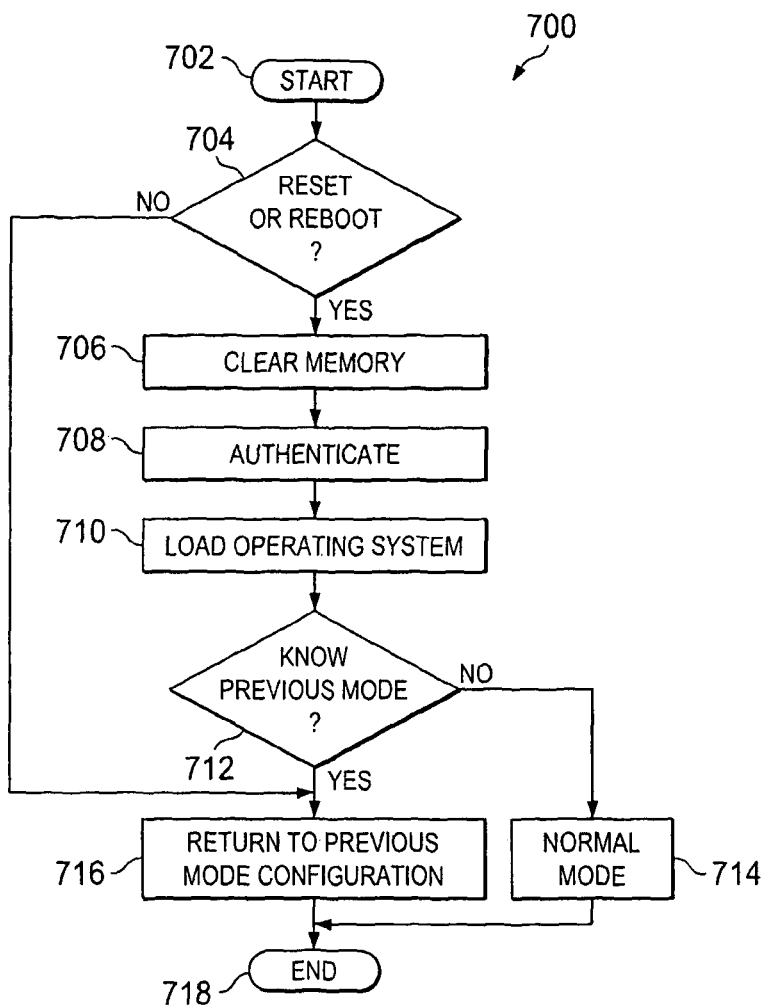
FIG. 7 is an embodiment of a flow diagram depicting a reset or a reboot method for a hand-held apparatus.

FIG. 7 is an embodiment of a flow diagram depicting a reset or a reboot method 700 for a hand-held apparatus. The method 700 may also be utilized for system initialization. The method 700 starts at step 702 and proceeds to step 704. At step 704, the method 700 determines if there is a request to rest or reboot. At step 706, the device memory is cleared, for example, to remove any memory available to rogue applications, hack software, and the like. At step 708, the method 700 authenticates the system, for example, by authenticating the hand-held device, applications, users, request and the like. At step 710, the operating system (OS) is loaded into memory. At step 712, the method 500 determines if the last previous mode is known. If the last previous mode is not known, the mode is set to normal mode in step 714. If the previous mode is known, the method 700 sets the mode and the configuration to the last previous known mode and configuration in step 716. From steps 714 and 716, the method 700 ends at step 718.

While the foregoing is directed to embodiments of the present invention, other and further embodiments of the invention may be devised without departing from the basic scope thereof, and the scope thereof is determined by the claims that follow.

What is claimed is:

1. A mode transition method for a hand-held device for ensuring a secured mode transition, wherein the handheld device is coupled to a calculator network, the method comprising:
   receiving a request, from an authorized at least one of source and person, to transition to a press-to-test mode, wherein the press-to-test mode allows a teacher to restrict at least one functionality available to the student on the hand-held device during a test; and
   transitioning to press-to-test mode relevant to the received request, wherein the transitioning is securely executed, and wherein only the authorized at least one of source and person is capable of unrestricting the at least one functionality or transitioning out of press-to-test mode, wherein the transitioning comprises clearing the memory, authentication, loading an operating system and configuring the hand-held device according to the received press-to-test request.

2. The method of claim 1, wherein the hand-held device is a calculator.

3. The method of claim 1, wherein the request is requesting a change from normal mode to press-to-test mode.

4. The method of claim 3, wherein the transition mode is a transition to press-to-test mode.

5. The method of claim 1, wherein the request is requesting a change from press-to-test mode to normal mode.

6. The method of claim 5, wherein the transition mode is a transition to normal mode.

7. The method of claim 1 further comprising indicating to a user the mode of the hand-held device.

8. The method of claim 7, wherein the mode indication is at least one of secured, tamper-free or hack-proof.

9. A non-transitory computer readable medium coupled to a handheld device, wherein the hand-held device is coupled to a calculator network, and wherein the non-transitory computer medium comprises instructions, when executed perform a mode transition method for ensuring a secured mode transition, the method comprising:
   receiving a request, from an authorized at least one of source and person, to transition to a press-to-test mode, wherein the press-to-test mode allows a teacher to restrict at least one functionality available to the student on the hand-held device during a test; and
   transitioning to press-to-test mode relevant to the received request, wherein the transitioning is securely executed, and wherein only the authorized at least one of source and person is capable of unrestricting the at least one functionality or transitioning out of press-to-test mode to allow the student access to all functionality available to the student on the hand-held device, wherein the transitioning comprises clearing the memory, authentication, loading an operating system and configuring the hand-held device according to the received press-to-test request.

10. The computer readable medium of claim 9, wherein the computer readable medium is coupled a calculator.

11. The computer readable medium of claim 9, wherein the request is requesting a change from normal mode to press-to-test mode.

12. The computer readable medium of claim 11, wherein the transition mode is a transition to press-to-test mode.

13. The computer readable medium of claim 9, wherein the request is requesting a change from press-to-test mode to normal mode.

14. The computer readable medium of claim 13, wherein the transition mode is a transition to normal mode.

15. The computer readable medium of claim 9, wherein the method further comprising indicating to a user the mode of the hand-held device.

16. The computer readable medium of claim 15, wherein the mode indication is at least one of secured, tamper-free or hack-proof.

* * * * *